(12) United States Patent
Kim et al.

(10) Patent No.: US 12,467,514 B2
(45) Date of Patent: Nov. 11, 2025

(54) SHOCK ABSORBER (71) Applicant: Samsung Electronics Co., Ltd., Suwon-si (KR)

(72) Inventors: Jungjae Kim, Suwon-si (KR); Muyer Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 407 days.

(21) Appl. No.: 18/108,438

(22) Filed: Feb. 10, 2023

(65) Prior Publication Data
US 2024/0026949 A1 Jan. 25, 2024

(30) Foreign Application Priority Data
Jul. 22, 2022 (KR) .......................... 10-2022-0090748

(51) Int. Cl.
F16F 15/03 (2006.01)
F16F 6/00 (2006.01)

(52) U.S. Cl.
CPC ................ F16F 15/03 (2013.01); F16F 6/00 (2013.01); F16F 2222/06 (2013.01); F16F 2230/08 (2013.01)

(58) Field of Classification Search
CPC .... F16F 15/03; F16F 6/00; F16F 6/005; F16F 2222/06; F16F 13/26
See application file for complete search history.

(56) References Cited

U.S. PATENT DOCUMENTS

| 4,699,348 A | * | 10/1987 | Freudenberg | F16F 13/26 180/300 |
| 4,892,328 A | * | 1/1990 | Kurtzman | F16F 15/03 188/267 |
| 5,263,558 A | * | 11/1993 | Yamaoka | F16F 15/03 188/267 |
| 5,570,286 A | * | 10/1996 | Margolis | B60G 99/004 280/124.1 |
| 7,845,050 B2 | | 12/2010 | Pyo | |
| 9,145,945 B2 | * | 9/2015 | Tan | F16F 15/0232 |
| 11,187,477 B2 | | 11/2021 | Snyder | |

(Continued)

FOREIGN PATENT DOCUMENTS

| CN | 109253204 A | * | 1/2019 | ............ F16F 13/002 |
| CN | 110953291 A | * | 4/2020 | .............. B61F 5/245 |

(Continued)

OTHER PUBLICATIONS

CN-106365019-A (Year: 2017).*

Primary Examiner — Thomas J Williams
(74) Attorney, Agent, or Firm — Muir Patent Law, PLLC (57) ABSTRACT A shock absorber includes a cylinder including a shock-absorbing surface configured to relieve an impact of an object, a piston rod including a first end receiving the object and, in response to the impact of the object, movably inserted into an inner space of the cylinder in an axial direction of the cylinder, a magnet installed at a second end of the piston rod opposite to the first end of the piston rod to be moved together with the piston rod, an electromagnet coil configured to generate a repulsive force against the magnet, and a sensor configured to detect the magnet and cause the electromagnet coil to receive a current from a power source.

20 Claims, 5 Drawing Sheets (56) References Cited

U.S. PATENT DOCUMENTS

| | | | |
|---|---|---|---|
| 2005/0046097 A1 | 3/2005 | Kim | |
| 2005/0072638 A1* | 4/2005 | Kim | F16F 15/03 |
| | | | 188/267.2 |
| 2009/0236192 A1* | 9/2009 | Takeuchi | F16F 6/00 |
| | | | 188/267 |
| 2020/0325959 A1* | 10/2020 | Sato | F16F 15/03 |
| 2021/0101435 A1* | 4/2021 | Yamazaki | B60G 17/01941 |
| 2021/0102597 A1 | 4/2021 | Romer | |
| 2021/0381294 A1 | 12/2021 | Bacchetti | |
| 2024/0026949 A1* | 1/2024 | Kim | F16F 15/03 |

FOREIGN PATENT DOCUMENTS

| | | | |
|---|---|---|---|
| DE | 102020119406 A1 * | 1/2022 | F16F 15/03 |
| KR | 100507756 B1 | 8/2005 | |
| KR | 100527732 B1 | 11/2005 | |
| KR | 100760518 B1 | 9/2007 | |
| KR | 20100059514 A * | 6/2010 | F16F 6/00 |
| KR | 100994205 B1 | 11/2010 | |
| KR | 1020130111908 A | 10/2013 | |
| KR | 102340888 B1 | 12/2021 | |
| KR | 1020220039336 A | 3/2022 | |

\* cited by examiner

SHOCK ABSORBER

CROSS-RELATED APPLICATION

This application claims priority under 35 USC § 119 to Korean Patent Application No. 10-2022-0090748, filed on Jul. 22, 2022 in the Korean Intellectual Property Office (KIPO), the contents of which are herein incorporated by reference in their entirety.

BACKGROUND

1. Field

Example embodiments relate to a shock absorber. More particularly, example embodiments relate to a shock absorber configured to relieve an impact generated by a collision of an object.

2. Description of the Related Art

Generally, a shock absorber may relieve an impact generated by a collision of an object using a return spring. The return spring may apply a resilient force to the object in a direction opposite to an applying direction of the collision to relieve the impact.

According to related arts, a shock absorption efficiency of the shock absorber may be gradually decreased in accordance with a lifespan of the return spring. Thus, it may be desirable to periodically exchange the shock absorber for a new one.

SUMMARY

Example embodiments provide a shock absorber that may be capable of maintaining shock absorption efficiency for a long time.

According to an embodiment of the present disclosure, a shock absorber includes a cylinder including a shock-absorbing surface configured to relieve an impact of an object, a piston rod including a first end receiving the object and, in response to the impact of the object, movably inserted into an inner space of the cylinder in an axial direction of the cylinder, a magnet installed at a second end of the piston rod opposite to the first end of the piston rod to be moved together with the piston rod, an electromagnet coil configured to generate a repulsive force against the magnet, and a sensor configured to detect the magnet and cause the electromagnet coil to receive a current from a power source.

According to an embodiment of the present disclosure, a shock absorber includes a cylinder including a slanted shock-absorbing surface configured to relieve an impact of an object, a piston rod including a first end receiving the object and, in response to the impact of the object, movably inserted into an inner space of the cylinder in an axial direction of the cylinder, a magnet installed at a second end of the piston rod opposite to first end of the piston rod to be moved together with the piston rod, an electromagnet coil configured to generate a repulsive force against the magnet, and a sensor arranged between the magnet and the electromagnet coil to detect the magnet for applying a current to the electromagnet coil.

According to an embodiment of the present disclosure, a shock absorber includes a cylinder including a slanted shock-absorbing surface configured to relieve an impact of an object, and a stopper formed at the slanted shock-absorbing surface to prevent the object from departing from the slanted shock-absorbing surface, a piston rod including a first end receiving the object and, in response to the impact of the object, movably inserted into an inner space of the cylinder in an axial direction of the cylinder, a shock-absorbing member attached to the first end of the piston rod, a magnet installed at a second end of the piston rod opposite to the first end of the piston rod to be moved together with the piston rod, an electromagnet coil configured to generate a repulsive force against the magnet, and a sensor arranged between the magnet and the electromagnet coil to detect the magnet for applying a current to the electromagnet coil. The slant shock-absorbing surface may be slant with respect to a radial direction of the cylinder substantially perpendicular to the axial direction of the cylinder at an angle of about 45° to about 60°.

According to example embodiments, the shock-absorbing member may relieve the impact of the object. The object may be slidably moved on the slant shock-absorbing surface to further relieve the impact of the object. The repulsive force generated by the electronic coil may be applied to the object to further relieve the impact of the object. Thus, in the shock absorber in the present disclosure, the three impact relief manners as listed above may contribute to relieve the impact of the object to improve a shock-absorbing efficiency of the shock absorber. Because the impact of the object may be relieved by the repulsive force, the improved shock-absorbing efficiency may be maintained for a long time.

BRIEF DESCRIPTION OF THE DRAWINGS

Example embodiments will be more clearly understood from the following detailed description taken in conjunction with the accompanying drawings. FIGS. 1 to 9 represent non-limiting, example embodiments as described herein.

DETAILED DESCRIPTION OF THE EMBODIMENTS

Hereinafter, example embodiments will be explained in detail with reference to the accompanying drawings.

Figure 1:
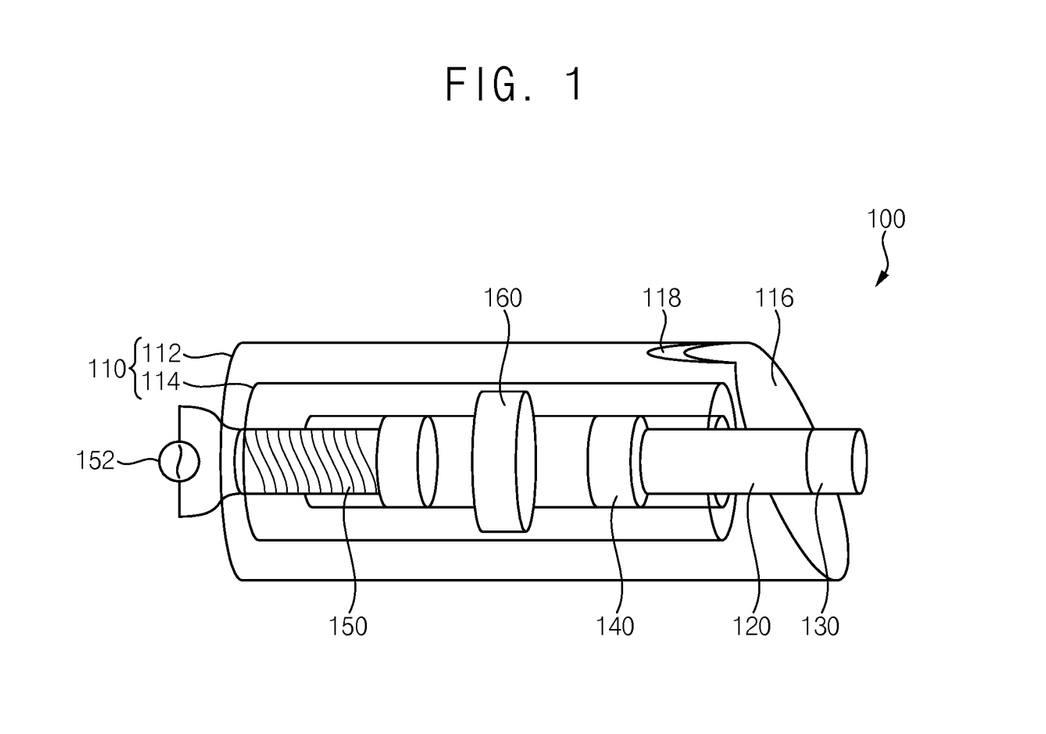
FIG. 1 is a perspective view illustrating an internal structure of a shock absorber in accordance with example embodiments.
Figure 2:
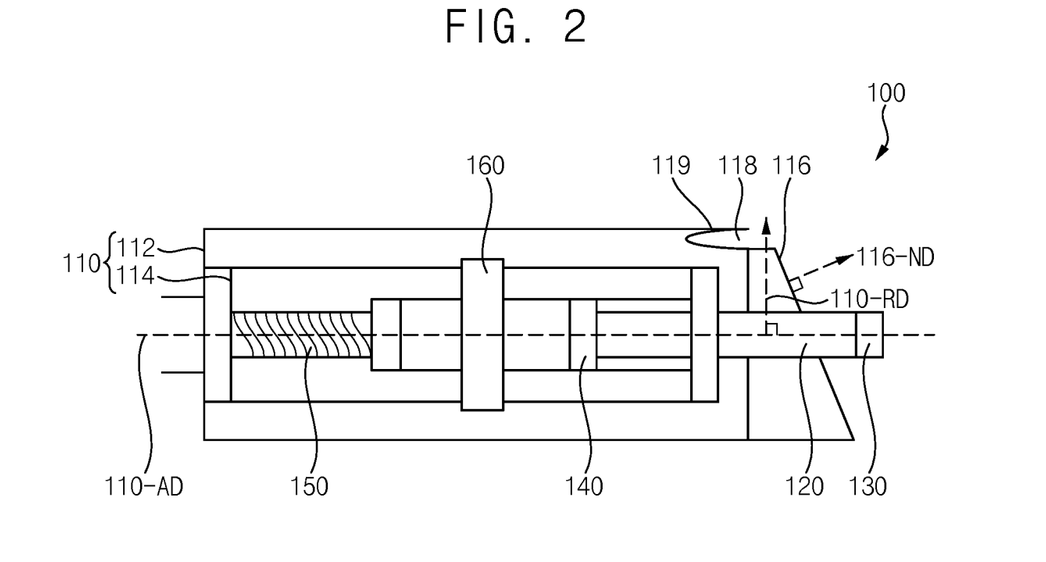
FIG. 2 is a cross-sectional view illustrating the shock absorber in FIG. 1.
Figure 3:
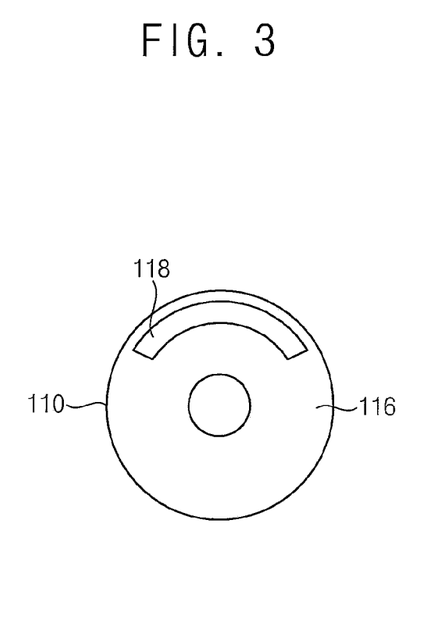
FIG. 3 is a side view illustrating the shock absorber in FIG. 2.

FIG. 1 is a perspective view illustrating an internal structure of a shock absorber in accordance with example embodiments, FIG. 2 is a cross-sectional view illustrating the shock absorber in FIG. 1 and FIG. 3 is a side view illustrating the shock absorber in FIG. 2.

Referring to FIGS. 1 to 3, a shock absorber 100 of example embodiments may be configured to relieve an impact of a moving object. For example, the shock absorber 100 may be arranged in a chamber of a semiconductor fabrication apparatus such as a semiconductor electronic die sort (EDS) prober to relieve an impact of a part such as a camera moved in the chamber. However, the shock absorber may be applied to various apparatuses, other than semiconductor fabrication apparatuses, requiring a structure configured to relieve the impact of a moving object.

The shock absorber 100 may include a cylinder 110, a piston rod 120, a shock-absorbing member 130, a magnet 140, an electromagnet coil 150 and a sensor 160.

The cylinder 110 may have an inner space. The inner space may be formed along an axial direction 110-AD of the cylinder 110. The axial direction 110-AD of the cylinder 110 may correspond to a collision direction of the object, i.e., an applying direction of an impact. The present invention is not limited thereto. For example, when an object collides with the cylinder 110 in a direction different from the axial direction 110-AD of the cylinder 110, the shock absorber 100 may relieve a force, parallel to the axial direction 110-AD, of the impact. The inner space may be exposed through one surface of the cylinder 110. The one surface of the cylinder 110 may correspond to a surface with which the object may collide. Thus, the one surface of the cylinder 110 may correspond to a shock-absorbing surface 116 of the cylinder 110.

The shock-absorbing surface 116 may be slant with respect to a radial direction 110-RD of the cylinder 110 substantially perpendicular to the axial direction 110-AD of the cylinder 110. The radial direction 110-RD may correspond to a radial direction, among multiple radial directions, which is at a same plane with a normal direction 116-ND of the shock-absorbing surface 116 and the axial direction 110-AD of the cylinder 110. When the object collides with the shock-absorbing surface 116, the object may be slidably moved along the slant shock-absorbing surface 116 in an upward direction. The impact of the object may be relieved during the slidable movement of the object. For example, an effective area between the object and the slant shock-absorbing surface 116 of the cylinder 110 may be larger than an effective area between the object and a vertical shock-absorbing surface of a conventional cylinder. Thus, the object may be slidably moved along the slant shock-absorbing surface 116 to relieve the impact of the object. Terms such as "same," "equal," "planar," "perpendicular" or "coplanar," as used herein encompass near identicality including variations that may occur, for example, due to manufacturing processes. The term "substantially" may be used herein to emphasize this meaning, unless the context or other statements indicate otherwise.

In example embodiments, a slant angle ⊖ of the shock-absorbing surface 116 with respect to the radial direction 110-RD of the cylinder 110 may be selected from a range of about 45° to about 60°. In an embodiment, the radial direction 110-RD, the normal direction 116-ND of the shock-absorbing surface 116, and the axial direction 110-AD may be at a same plane. For example, the slant angle ⊖ may be measured in a counter-clockwise direction from a vertical line extending along the radial direction 110-RD toward the shock-absorbing surface 116. When the slant angle ⊖ of the shock-absorbing surface 116 may be below about 45°, an impact transfer efficiency from the object to the cylinder 110 may be very low so that the shock absorber 100 may have low shock-absorbing efficiency. In contrast, when the slant angle ⊖ of the shock-absorbing surface 116 may be above about 60°, the object may not be effectively moved along the shock-absorbing surface 16. In this case, the effective area between the object and the slant shock-absorbing surface 116 may be similar to the effective area between the object and the vertical shock-absorbing surface. Therefore, when the slant angle ⊖ of the shock-absorbing surface 116 with respect to the radial direction of the cylinder 110 may be about 45° to about 60°, the shock absorber 100 may have improved shock-absorbing efficiency. Terms such as "about" or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

A stopper may be formed on the shock-absorbing surface 116. When the object continuously moves along the slant shock-absorbing surface 116, the object may depart from the slant shock-absorbing surface 116. The departing of the object from the slant shock-absorbing surface 116 may decrease the impact transfer efficiency from the object to the shock absorber 100. The stopper may prevent the object from departing from the slant shock-absorbing surface 116.

In example embodiments, the stopper may include a stopping groove 118 formed at the shock-absorbing surface 116. The stopping groove 118 may be formed at an upper portion of the shock-absorbing surface 116. The stopping groove 118 may extend along a circumferential direction of the shock-absorbing surface 116. The present invention is not limited thereto. For example, the stopping groove 118 may be formed at the upper portion of the shock-absorbing surface 116 in a horizontal direction. The object slidably moving along the shock-absorbing surface 116 may be trapped by an upper jaw 119 of the stopping groove 118 so that the object may not be upwardly moved any more.

In example embodiments, the cylinder 110 may include an outer tube 112 and an inner tube 114. The inner tube 114 may be inserted into the outer tube 112. That is, an outer circumferential surface of the inner tube 114 may closely contact an inner circumferential surface of the outer tube 112. Thus, an inner space of the inner tube 114 may correspond to the inner space of the cylinder 110. Alternatively, the cylinder 110 may include a single tube. The term "contact," as used herein, refers to a direct connection (i.e., touching) unless the context indicates otherwise.

The piston rod 120 may be movably inserted into the inner space of the cylinder 110 along the axial direction of the cylinder 110. The piston rod 120 may include an inner end (i.e., a second end) oriented toward the inner space of the cylinder 110 and an outer end (i.e., a first end) oriented toward the shock-absorbing surface 116. The outer end may be selectively protruded from the inner space of the cylinder 110. The object may first collide with the outer end of the piston rod 120 protruded from the cylinder 110. The piston rod 120 may then be moved into the inner space of the cylinder 110 by the impact applied to the piston rod 120 from the object.

In order to relieve the impact of the piston rod 120 from the object, the shock-absorbing member 130 may be attached to the outer end of the piston rod 120. The shock-absorbing member 130 may include a resilient material for relieving the impact. For example, the shock-absorbing member 130 may include a rubber. The present invention is not limited thereto.

The magnet 140 may be installed at the inner end of the piston rod 120. Thus, the magnet 140 may move into the inner space of the cylinder 110 together with the piston rod 120. The magnet 140 may include ferrite. The present invention is not limited thereto.

The electromagnet coil 150 may be arranged in the inner space of the cylinder 110. The electromagnet coil 150 may be positioned in a region opposite to the piston rod 120. A power source 152 may be electrically connected to the electromagnet coil 150 to selectively apply a current to the electromagnet coil 150. When the current may be applied to the electromagnet coil 150, the electromagnet coil 150 may have a polarity substantially the same as a polarity of the magnet 140. Thus, a repulsive force may be generated between the electromagnet coil 150 and the magnet 140. The repulsive force may be applied to the piston rod 120 along a direction opposite to the impact applying direction. As a result, the repulsive force may relieve the impact of the object transferred through the piston rod 120. With the repulsive force generated by the electromagnet coil 150, the impact of the object may be relieved in a contactless manner, and thus excessive wear of components in the shock absorber 100 may be avoided, thereby reducing maintenance costs of the shock absorber 100.

The sensor 160 may be arranged in the inner space of the cylinder 110 between the electromagnet coil 150 and the magnet 140. The sensor 160 may detect the magnet 140 moved into the inner space of the cylinder 110 by the impact of the object. When the sensor 160 may detect the magnet 140, the sensor 160 may transmit a detection signal to the power source 152. The power source 152 may then apply the current to the electromagnet coil 150. In an embodiment, the sensor 160 may include a motion sensor, a contact sensor, or a magnetic field sensor.

In example embodiments, the electromagnet coil 150 may be controlled to generate the repulsive force by the magnet 140 moving together with the piston rod 120 and the sensor 160 configured to detect the magnet 140. For example, the electromagnet coil 150 may generate the repulsive force immediately after the sensor 160 detects the magnet 140 to relieve the impact of the object.

Figure 4:
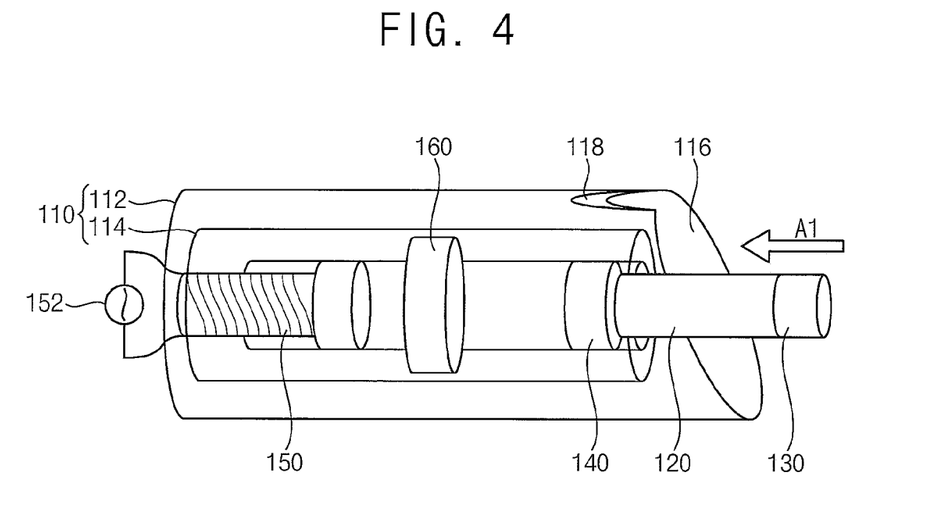
FIGS. 4 to 6 are perspective views illustrating shock-absorbing operations of the shock absorber in FIG. 1.
Figure 5:
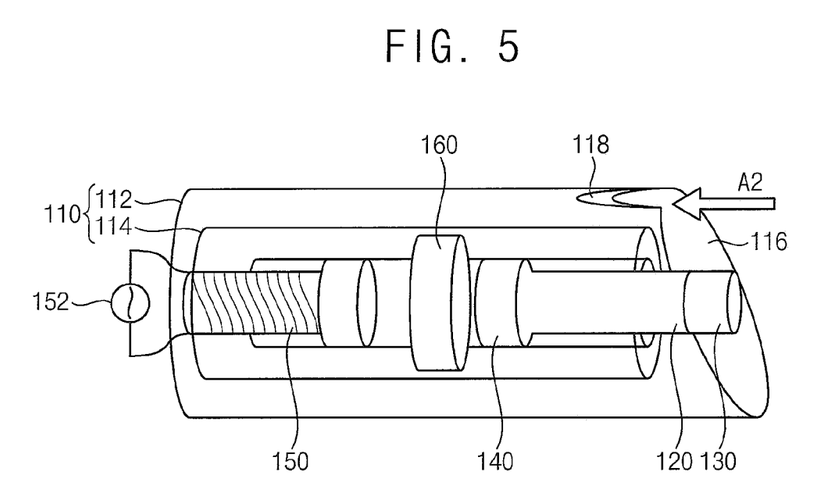
Figure 6:
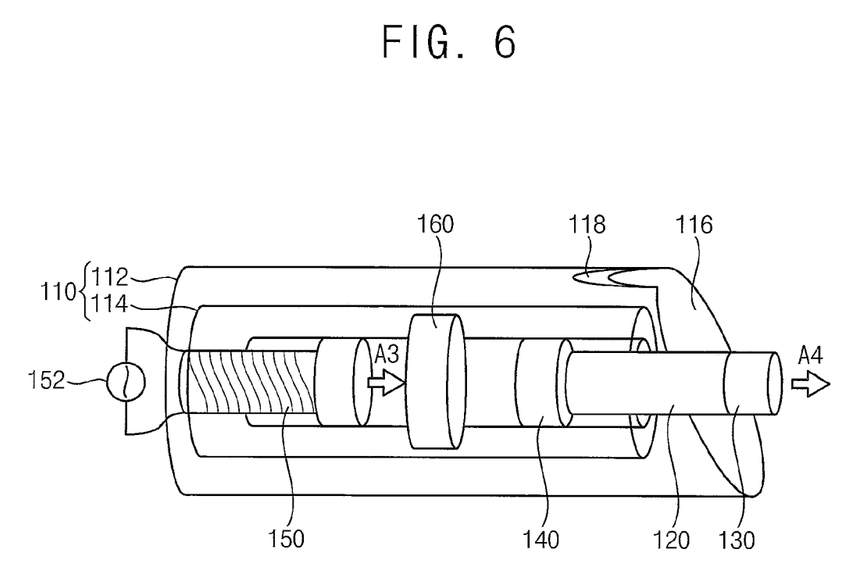

FIGS. 4 to 6 are perspective views illustrating shock-absorbing operations of the shock absorber in FIG. 1.

Referring to FIG. 4, when the object may collide with the shock absorber 100 in a direction of a first arrow A1, the object may first collide with the shock-absorbing member 130. The shock-absorbing member 130 may relieve the impact of the object.

Referring to FIG. 5, the object may move along the direction of the first arrow A1 so that the piston rod 120 may be moved into the inner space of the cylinder 110 by the impact of the object. The piston rod 120 may continuously move into the inner space of the cylinder 110 until the shock-absorbing member 130 may be positioned at a plane substantially coplanar with a plane of the slant shock-absorbing surface 116.

When the object contacts the slant shock-absorbing surface 116, the object may move upwardly along the slant shock-absorbing surface 116. In an embodiment, during a time when the piston rod 120 continuously moves into the inner space of the cylinder 110, the object may move upwardly along the slant shock-absorbing surface 116. Thus, the slant shock-absorbing surface 116 may further relieve the impact of the object.

The object, which may continuously move upwardly along the slant shock-absorbing surface 116, may be trapped by the stopping groove 118 so that the object may not be moved upwardly any more. Thus, the object may not depart from the slant shock-absorbing surface 116. As a result, the object trapped in the stopping groove 118 may compress the slant shock-absorbing surface 116 along a direction of a second arrow A2 oriented toward the stopping groove 118.

Because the piston rod 120 may continuously move into the inner space of the cylinder 110, the magnet 140 may contact the sensor 160. When the sensor 160 may detect the magnet 140, the sensor 160 may transmit the detection signal to the power source 152.

The current supplied from the power source 152 may be applied to the electromagnet coil 150 to provide the electromagnet coil 150 with the polarity substantially the same as the polarity of the magnet 140. Thus, the repulsive force may be formed between the electromagnet coil 150 and the magnet 140 along a direction of a third arrow A3. The repulsive force may be applied to the piston rod 120 in the direction opposite to the impact applying direction. As a result, the repulsive force may be applied to the piston rod 120 in a direction of a fourth arrow A4. Thus, the piston rod 120 may move in the direction of the fourth arrow A4 to further relieve the impact of the object.

Figure 7:
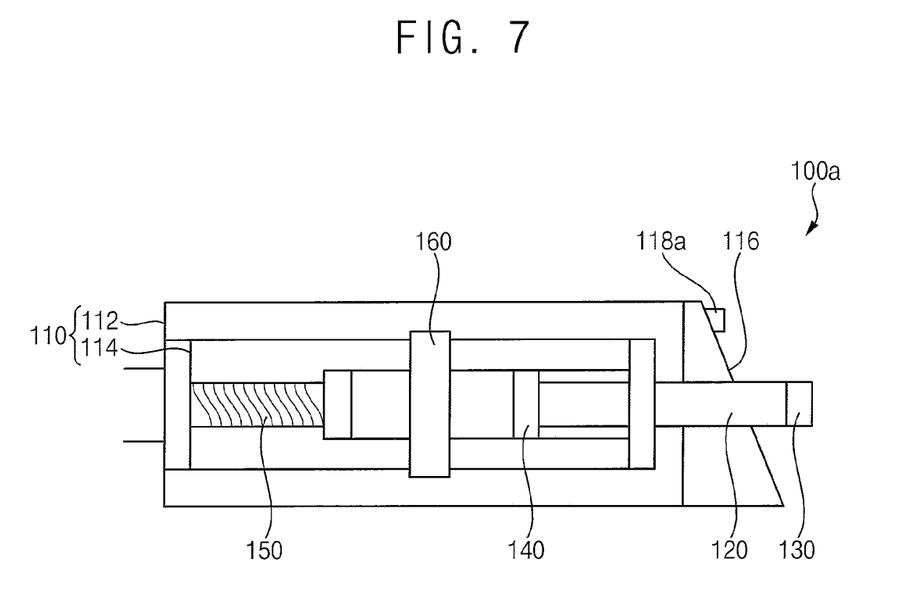
FIG. 7 is a cross-sectional view illustrating an internal structure of a shock absorber in accordance with example embodiments.
Figure 8:
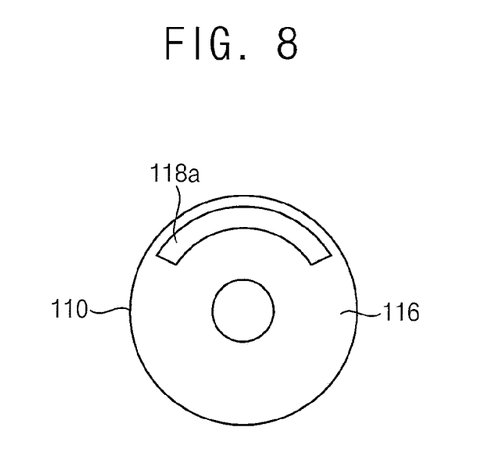
FIG. 8 is a side view illustrating the shock absorber in FIG. 7.

FIG. 7 is a cross-sectional view illustrating an internal structure of a shock absorber in accordance with example embodiments and FIG. 8 is a side view illustrating the shock absorber in FIG. 7.

A shock absorber 100a of example embodiments may include elements substantially the same as those of the shock absorber 100 in FIG. 2 except for a stopper. Thus, the same reference numerals may refer to the same elements and further descriptions of the same elements may be omitted herein for brevity.

Referring to FIGS. 7 and 8, a stopper of example embodiments may include a stopping protrusion 118a formed on the shock-absorbing surface 116. That is, the stopping protrusion 118a may be protruded from the shock-absorbing surface 116. The stopping protrusion 118a may be formed on the upper portion of the shock-absorbing surface 116 along the circumferential direction of the shock-absorbing surface 116. The present invention is not limited thereto. For example, the stopping protrusion 118a may be formed on the upper portion of the shock-absorbing surface 116 in the horizontal direction. The object slidably moving along the shock-absorbing surface 116 may be trapped by the stopping protrusion 118a so that the object may not be moved upwardly any more.

Figure 9:
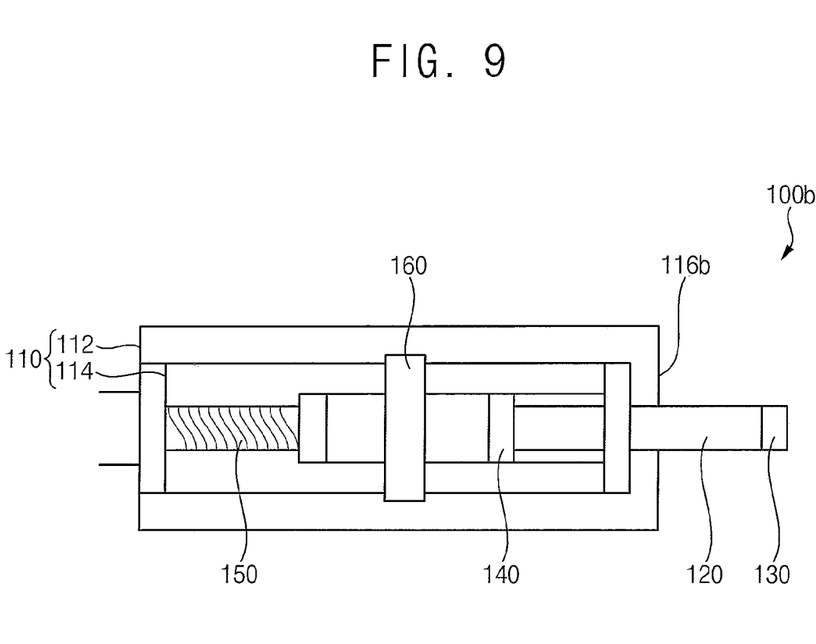
FIG. 9 is a cross-sectional view illustrating an internal structure of a shock absorber in accordance with example embodiments.

FIG. 9 is a cross-sectional view illustrating an internal structure of a shock absorber in accordance with example embodiments.

A shock absorber 100a of example embodiments may include elements substantially the same as those of the shock absorber 100 in FIG. 2 except for a shock-absorbing surface. Thus, the same reference numerals may refer to the same elements and further descriptions of the same elements may be omitted herein for brevity.

Referring to FIG. 9, a shock-absorbing surface 116b of example embodiments may be a vertical surface substantially parallel to the axial direction of the cylinder 110. That is, the vertical shock-absorbing surface 116b may not be slant with respect to the axial direction of the cylinder 110.

Although the shock-absorbing surface 116b may not have a slant structure, the shock-absorbing member 130 and the repulsive force by the electromagnet coil 150 may effectively relieve the impact of the object.

According to example embodiments, the shock-absorbing member may relieve the impact of the object. The object may slidably move along the slant shock-absorbing surface to further relieve the impact of the object. The repulsive force generated by the electronic coil may be applied to the object to further relieve the impact of the object. Thus, the impact of the object may be relieved in the three manners, as described above, to improve a shock-absorbing efficiency.

The impact of the object may be relieved by the repulsive force, and the improved shock-absorbing efficiency may be maintained for a long time. For example, with the repulsive force generated by the electromagnet coil 150, the impact of the object may be relieved in a contactless manner, and thus excessive wear of components in the shock absorber 100 may be avoided, thereby reducing maintenance costs of the shock absorber 100.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A shock absorber comprising:
   a cylinder including a shock-absorbing surface configured to relieve an impact of an object,
   wherein the shock-absorbing surface is a slanted surface slanted with respect to a first radial direction of the cylinder substantially perpendicular to an axial direction of the cylinder;
   a piston rod including a first end receiving the object and, in response to the impact of the object, movably inserted into an inner space of the cylinder in the axial direction of the cylinder through the slanted surface, wherein the piston rod moves with respect to the slanted surface;
   a magnet installed at a second end of the piston rod opposite to the first end of the piston rod to be moved together with the piston rod;
   an electromagnet coil configured to generate a repulsive force against the magnet; and
   a sensor disposed at the inner space of the cylinder and configured to detect the magnet and cause the electromagnet coil to receive a current from a power source.

2. The shock absorber of claim 1,
   wherein the first radial direction, the axial direction, and a normal direction of the shock-absorbing surface are on a same plane.

3. The shock absorber of claim 2,
   wherein the shock-absorbing surface has a slant angle with respect to the first radial direction of the cylinder at an angle selected from a range of about 45° to about 60°, and
   wherein the slant angle is measured in a counter-clockwise direction with reference to the first radial direction.

4. The shock absorber of claim 2,
   wherein the cylinder further comprises a stopper formed at the shock-absorbing surface to prevent the object from departing from the shock-absorbing surface.

5. The shock absorber of claim 4,
   wherein the stopper comprises at least one stopping groove formed at the shock-absorbing surface.

6. The shock absorber of claim 5,
   wherein the at least one stopping groove extends along a circumferential direction of the shock-absorbing surface.

7. The shock absorber of claim 4,
   wherein the stopper comprises at least one stopping protrusion protruded from the shock-absorbing surface.

8. The shock absorber of claim 7,
   wherein the at least one stopping protrusion extends along a circumferential direction of the shock-absorbing surface.

9. The shock absorber of claim 1,
   wherein the cylinder comprises:
   an outer tube; and
   an inner tube inserted into the outer tube to form the inner space of the cylinder.

10. The shock absorber of claim 1, further comprising:
    a shock-absorbing member attached to the first end of the piston rod.

11. The shock absorber of claim 1,
    wherein the sensor is arranged between the magnet and the electromagnet coil.

12. A shock absorber comprising:
    a cylinder including a slanted shock-absorbing surface configured to relieve an impact of an object,
    wherein the slanted shock-absorbing surface is a slanted surface slanted with respect to a first radial direction of the cylinder substantially perpendicular to an axial direction of the cylinder;
    a piston rod including a first end receiving the object and, in response to the impact of the object, movably inserted into an inner space of the cylinder in the axial direction of the cylinder through the slanted surface, wherein the piston rod moves with respect to the slanted surface;
    a magnet installed at a second end of the piston rod opposite to the first end of the piston rod to be moved together with the piston rod;
    an electromagnet coil configured to generate a repulsive force against the magnet; and
    a sensor arranged between the magnet and the electromagnet coil to detect the magnet for applying a current to the electromagnet coil, wherein the sensor is disposed at the inner space of the cylinder.

13. The shock absorber of claim 12,
    wherein the slanted shock-absorbing surface is slanted with respect to the first radial direction of the cylinder, and
    wherein the first radial direction, the axial direction, and a normal direction of the slanted shock-absorbing surface are on a same plane.

14. The shock absorber of claim 13,
    wherein the slanted shock-absorbing surface has a slant angle with respect to the first radial direction of the cylinder at an angle selected from a range of about 45° to about 60°, and
    wherein the slant angle is measured in a counter-clockwise direction with reference to the first radial direction.

15. The shock absorber of claim 13,
    wherein the cylinder further comprises a stopper formed at the slanted shock-absorbing surface to prevent the object from departing from the slanted shock-absorbing surface.

16. The shock absorber of claim 15,
wherein the stopper comprises at least one stopping groove formed at the slanted shock-absorbing surface.

17. The shock absorber of claim 15,
wherein the stopper comprises at least one stopping protrusion protruded from the slanted shock-absorbing surface.

18. The shock absorber of claim 12, further comprising:
a shock-absorbing member attached to the first end of the piston rod.

19. A shock absorber comprising:
a cylinder including:
a slanted shock-absorbing surface configured to relieve an impact of an object, wherein the slanted shock-absorbing surface is a slanted surface slanted with respect to a first radial direction of the cylinder substantially perpendicular to an axial direction of the cylinder; and
a stopper formed at the slanted shock-absorbing surface to prevent the object from departing from the slanted shock-absorbing surface;
a piston rod including a first end receiving the object and, in response to the impact of the object, movably inserted into an inner space of the cylinder in the axial direction of the cylinder through the slanted surface, wherein the piston rod moves with respect to the slanted surface;
a shock-absorbing member attached to the first end of the piston rod;
a magnet installed at a second end of the piston rod opposite to the first end of the piston rod to be moved together with the piston rod;
an electromagnet coil configured to generate a repulsive force against the magnet; and
a sensor arranged between the magnet and the electromagnet coil to detect the magnet for applying a current to the electromagnet coil.

20. The shock absorber of claim 19,
wherein the stopper comprises at least one stopping groove formed at the slanted shock-absorbing surface, and
wherein the at least one stopping groove extends along a circumferential direction of the slanted shock-absorbing surface.

\* \* \* \* \*